June 1, 1926.  
R. L. HANAU  
DENTAL ARTICULATOR  
Filed Feb. 3, 1921  
1,586,739  
4 Sheets-Sheet 3

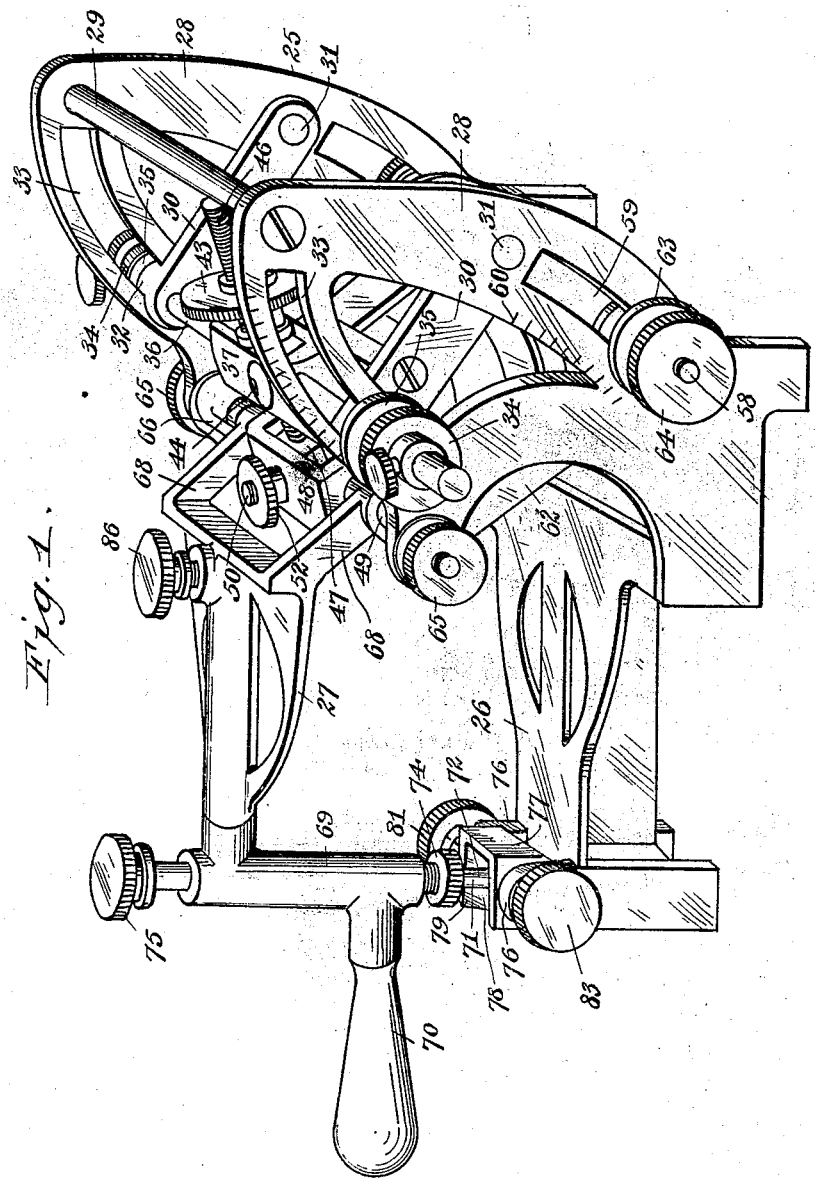

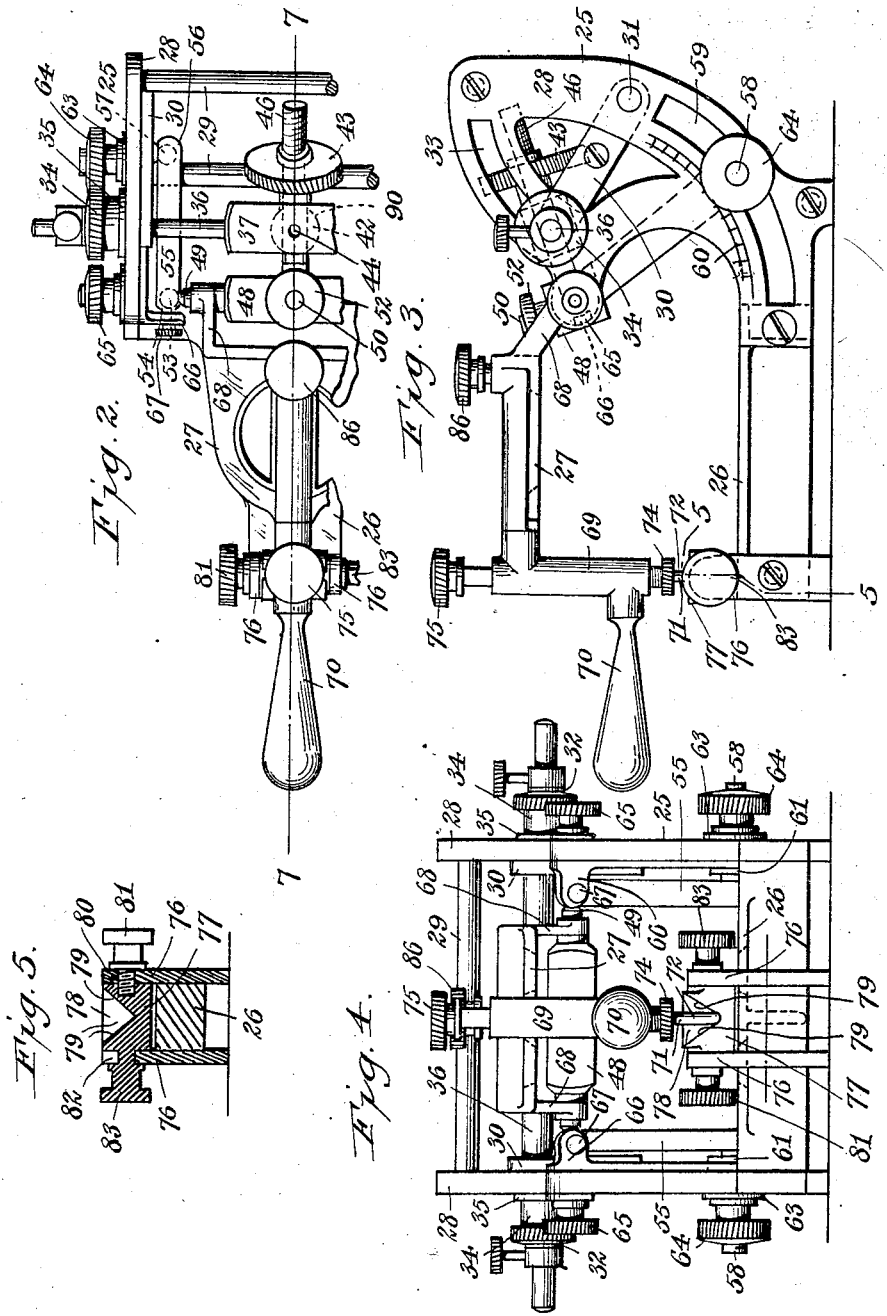

Rudolph L. Hanau, INVENTOR,

BY

Emil Heuhart ATTORNEY

June 1, 1926.

R. L. HANAU 1,586,739

DENTAL ARTICULATOR

Filed Feb. 3, 1921

Rudolph L. Hanau, INVENTOR,

BY Emil Neuhart, ATTORNEY

Patented June 1, 1926.

1,586,739

UNITED STATES PATENT OFFICE.

RUDOLPH L. HANAU, OF BUFFALO, NEW YORK, ASSIGNOR TO JACOB L. STERN, OF BUFFALO, NEW YORK.

DENTAL ARTICULATOR.

Application filed February 3, 1921. Serial No. 442,036.

This invention relates to dental articulators, such as dentists use for supporting artificial teeth on plates or bases in the same relation to each other that they are to occupy when placed in the mouth of a patient.

The primary object of my invention is to provide a device of this kind by means of which the movements of the human mandible are accurately reproduced.

Another object of my invention is to provide a device in which the parts thereof are capable of adjustment so as to accurately conform with the measurements and conditions found in each individual patient, and in which means is provided to enable artificial teeth to be readily positioned so as to conform with the anatomical measurements which are taken directly from the patient or by means of casts taken off the patient.

A further object of my invention is to provide a device of this kind which will serve as an aid in the grinding of artificial dentures of various tooth and arch formations, and which will enable the operator to predetermine a correct arch form and correct tooth inclinations of dentures in malocclusion.

A still further object of my invention is the production of an articulator of the kind mentioned embodying means whereby the inclined planes of the teeth are suitably guided, preferably by means of two constrained path surfaces and an open guiding surface.

A still further object of my invention is to provide a device of this character in which means is embodied for adjusting the lateral, the incisive and the opening movement of the upper jaw member in direction, or magnitude, or both.

A still further object is the provision of means for adjusting the direction of the lateral movement of the upper jaw member in three dimensions.

The above-mentioned and other objects are realized by embodying in an articulator means in which the condyle movements occur in intersection of spherical surfaces, the centers of which are adjustable in space.

The invention consists in supporting one denture in a fixed position and superposing the other denture in a manner capable of movement toward and from the first-mentioned denture while holding said other denture movable in other respects from points movable in space along two constrained paths or path surfaces and a guiding surface.

The invention further consists in the novel features of construction and in the arrangement and combination of parts to be hereinafter described and more particularly pointed out in the subjoined claims.

Referring to the drawings in detail like numerals of reference refer to like parts in the several figures.

Fig. 1 is a perspective view of my improved articulator.

Fig. 2 is a plan view, with part thereof broken away.

Fig. 3 is a side elevation.

Fig. 4 is a front elevation.

Fig. 5 is an enlarged vertical section taken on line 5—5, Fig. 3.

Figure 7:
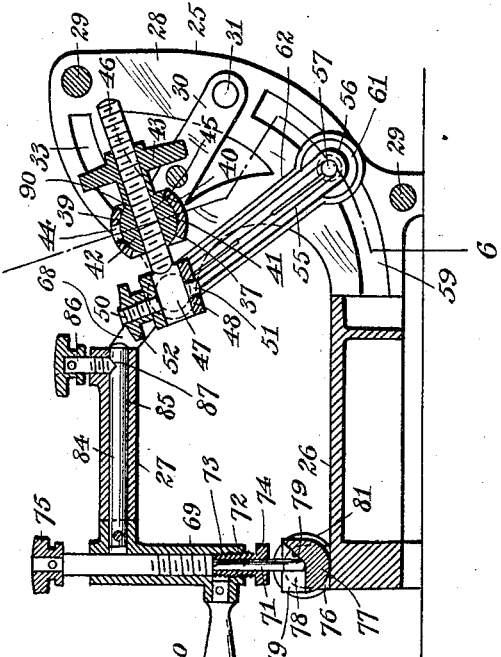
Fig. 7 is a vertical longitudinal section taken on line 7—7, Fig. 2.
Figure 6:
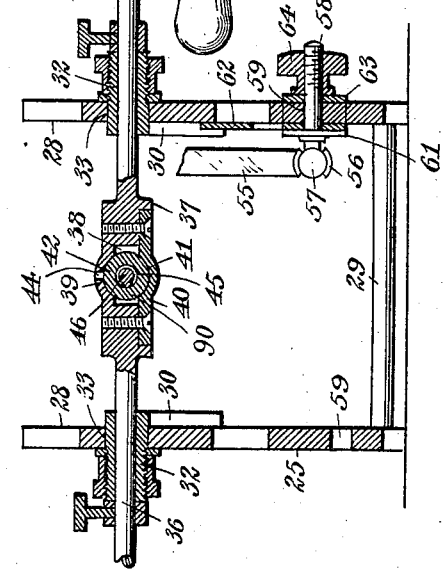
Fig. 6 is a transverse section taken on line 6—6, Fig. 7.

In the representative form of my invention illustrated in the drawings, the numeral 25 designates a frame or support on which is formed or to which is secured the lower jaw-member 26 so called by reason of the fact that it supports the lower jaw plate or mandibular denture.

27 represents the upper jaw-member or bracket to which is secured the upper jaw plate or maxiliary denture, said jaw-member or bracket being adjustably mounted on and carried by the frame or support.

The frame or support comprises two side members 28 which are held spaced apart by combined spacing and tie elements 29, or otherwise.

Pivotally secured to the inner side of each of the two side members, as at 31, is a lever 30 having an outstanding guide boss 32. The bosses of the two levers extend through segmental guide-slots 33 formed in said side members and have the pivots 31 as their centers. These bosses are of sufficient length to project a distance outwardly beyond the outer faces of said side members and the projecting portions are externally threaded to receive clamping nuts 34 which bear against the outer sides of washers 35 in contact with said side members. In this manner the levers 30 can be swung on their pivots 31 to move the bosses at the outer ends thereof to any desired points of the segmental slots, at which points they may be retained by tightening of the nuts 34.

The guide bosses 32 are provided with axial bores in which a rod 36 is mounted for rotatable and slidable adjustment, said rod having an enlargement 37 midlength serving as part of a ball and socket device. In preferred form, said enlargement comprises a saddle-like member having a depressed portion 38 provided with a concaved seat 39 and a retainer plate 40 which is secured to said saddle-like member by means of screws or otherwise, said plate having a concaved interior portion or seat 41, between which and the concaved seat 40 of the saddle-like member, the spherical end or ball 42 of a nut 43 is self adjustably retained, a suitable hole 44 being formed through the ball seat 39 for conveniently providing the ball and socket device, thus formed, with oil.

A tapped opening 45 is formed through the integral ball and nut at right angles to the axis of the rod 36. The ball and socket device is therefore provided with a ball or spherical member, which is universally movable within the socket or saddle-like center of the rod while the rod is adjustable lengthwise and also in an arc of a circle having the pivots 31 of the levers 30 as its axis.

Passed through the ball-ended nut formed by the parts 42 and 43 is a screw rod 46 having an enlargement or head 47 at its front end. This screw rod is adjusted by rotating the ball-ended nut, which will position the enlargement or head 47 of said screw rod at any desired point. The head 47 of said screw rod is preferably of rectangular formation in cross section and is confined within a box-like member or loop 48 formed midlength on a spindle 49 with its upper side drawn into contact with the upper wall of said box-like member or loop, said head having a screw stud 50 projecting upwardly therefrom which passes through the upper wall of said box-like member or loop and projects upwardly a distance above said upper wall, and a short stud 51 which is entered in an opening in the lower wall of said box-like member or loop, said studs serving as a pivot for the screw rod 46. On the upper or projecting portion of said screw stud 50 a clamping nut 52 is threaded which serves to draw said head upwardly in firm contact with the upper wall of said box-like member or loop and thus retain the screw rod 46 in any adjusted position. The space in said box-like member or loop in which the head of said screw rod is positioned is somewhat wider than said head so that clearance is provided at each side of the latter to permit said screw rod to swing on its pivot.

The spindle 49 may be said to have two spindle members at opposite sides of its box-like member or loop 48 and the outer ends of these spindle members terminate a short distance from the side wall and are preferably provided with spherical terminals 53 which are entered within socketed portions 54 formed in the outer ends of supporting levers 55, the inner ends of said levers having socketed portions 56 which receive the spherical inner ends 57 of pivot studs 58 adjustably retained within segmental slots 59 formed in the side members of the frame and having the spherical terminals of the spindles as the centers on which they are adapted to swing. As the spindle 49 is connected to other parts allowing it freedom of movement within a certain range of space, the points on which the supporting levers are swung when adjusting the same may be said to be floating centers.

It is to be noted that the segmental slots 33 and 59 are conversely arranged and on the side members adjacent the slots 59 graduations 60 are formed to enable the user to position the pivot studs 58 at opposite sides of the frame at corresponding points or at predetermined different points. These graduations while permitting the operator to adjust the device in exact accordance with the measurements of the patient's mandible and to any special conditions, also enable the operator to reset the centers of the supporting levers when replacing dentures in the device to a previous adjustment. The supporting levers 55 are therefore connected to the spindle 49 by ball and socket joints and a similar connection is provided for connecting said levers to the studs 58. Universal joints are therefore employed at the inner ends of the supporting levers and also at the outer ends of the spindle, which may also be termed a connecting member, since it connects the upper or outer ends of the supporting levers, although allowing independent movement of each.

Each of the pivot studs 58 is provided with a circumferential flange 61 near its ball or spherical end 57, which flange bears against the inner side of a lever 62 having said stud as its pivot. Each of the levers 62 is enlarged at its outer end and serves as a washer for the pivot stud 58. A washer 63 surrounds each pivot stud 58 and bears against the outer side of the frame. Each of the studs 58 extends outwardly a distance beyond the outer face of the frame and is externally threaded and this externally threaded portion has a thumb nut 64 applied thereto. Thus, the inner ends of the levers 62 and the outer ends of the levers 55 have their centers co-axial and are retained by the thumb nuts 64 at any desired points within the range of the segmental slots 59. It is, however, to be understood that the levers 62 swing only in an arc of a circle, while the levers 55 swing on the surfaces of spheres which permit them to swing in an arc of a circle and at the same time, when required, have a component lateral movement by reason of the outer ends of said levers 55 being connected by means of ball and socket devices to the spindle or connecting member 49. The component lateral movement varies, depending upon the positions of the pivot studs 58 within the slots and also the position and, under certain conditions, the direction of the screw rod 46. It will be apparent therefore that the outer ends of the supporting levers move along surfaces of spheres.

The upper or inner ends of the levers 62 have screw studs extending outwardly therefrom which pass through suitable openings formed in the side members 28 of the frame and these studs have thumb nuts 65 threaded thereon to assist in maintaining said levers in any adjusted position. Each of the levers has an inwardly projecting arm 66 at its inner terminal through which an adjustable screw stop 67 is passed, said stops serving to limit the forward movements of the supporting levers 55 and consequently the forward movement of the ball-ends of the spindle or connecting member 49.

From the foregoing it will be clear that the levers 62 provide temporarily fixed centers at their outer ends for the supporting levers 55 while the outer ends of said levers 55 have a limited range of movement along constrained path surfaces and that the degree of such movement is controlled by the screw rod 46 and the ball-ended nut into which it is adjustably threaded and also by the positions of the temporarily fixed centers mentioned.

I have termed the upper ends of the levers 62 the "inner ends", due to the fact that they swing from these ends, while the upper ends of the levers 55 I term the "outer ends", due to the fact that they are movable along surfaces of spheres having the ball ends of the studs 58 as their centers. Therefore corresponding ends of said levers 55 and 62 are differently termed, and with the parts arranged as described, the centers on which the levers 55 swing are bodily movable or, as may be stated, are movable through space.

The upper jaw-member or bracket 27 is substantially horizontally disposed and at its rear end has two downwardly and rearwardly inclined arms 68 through which the spindle or connecting member 49 is passed, said spindle or member serving as a pivot on which said upper jaw-member or bracket is adapted to swing. Extending downwardly from the front end of said rod is a vertically disposed sleeve 69 having a handle 70 projecting forwardly therefrom by means of which said member or bracket may be manipulated.

The sleeve 69 is internally threaded, and adjustably arranged therein, preferably by means of screw threads, is a guide pin 71 having a reduced lower end 72 forming a downwardly facing shoulder 73 against which a lock nut 74 bears, said lock nut being adjustable in the lower end of the sleeve 69 so that when adjusting the guide pin, said nut may be positioned to engage said shoulder and retain said guide pin in adjusted position. The guide pin is provided with a knurled head 75 for conveniently adjusting the pin. The lower jaw or mandibular member is provided with two spaced upstanding lugs or ears 76 at its front end between which is mounted for rotatable adjustment a guide block 77 having an upwardly and forwardly opening cavity 78 providing guide surfaces 79 arranged at an angle to each other. One of the lugs 76 has a hole 80 therein through which a set screw 81 is passed which is threaded into the guide block, and the other lug has an upwardly opening slot 82 therein in which a headed pin 83 projecting from said guide block is seated; said set screw and pin serving as pivots on which said block may be rotatably adjusted. The set screw serves also to clamp the guide block securely between the lugs 76 after being adjusted to desired position.

For the purpose of allowing the sleeve 69 and its supported guide pin 71 to be removed from the upper jaw member so that an unobstructed view may be had of the teeth set up in the device, said sleeve is secured to a spindle 84 inserted into a longitudinal bore 85 formed in said upper jaw member, and to hold said spindle in position, a set screw 86 is threaded through the upper jaw and entered into a notch 87 formed in said spindle.

The balls or spherical terminals 53 at the outer ends of the spindle or transverse pivot member 49 represent two angular points of a substantially equilateral triangle or, more particularly, what is accepted as the "Bonwill triangle," which has its third angular point at the center of the central incisor, as at 88, the three points of this triangle being illustrative of the three points of the mandible.

The base or line of the triangle represents a line passing through the center of the condyle heads, and the apex 88 is represented as being at the contact point of the lower central incisor. This particular triangle was originally applied to the maxilla, and the points thereof are accepted for the mandible, and therefore these three points have definite relation to the mandible, and I have applied this triangle diagrammatically to illustrate the operation of my improved device.

Figure 8:
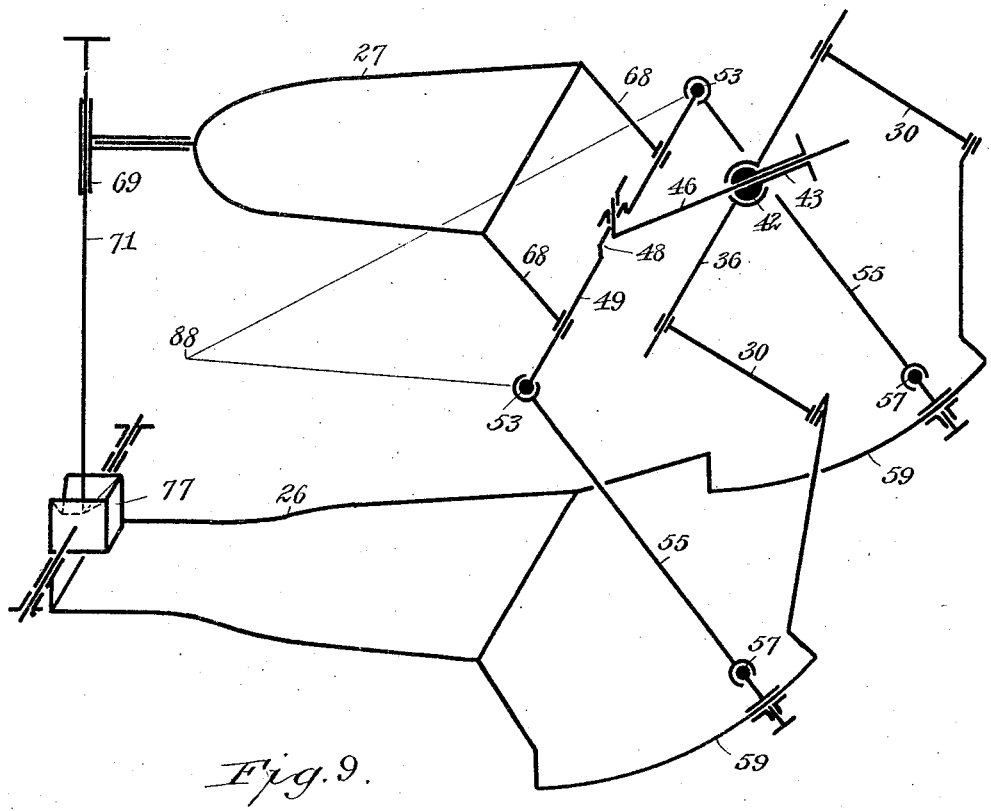
Fig. 8 is a diagrammatic view of the several co-operating parts of the device.
Figure 9:
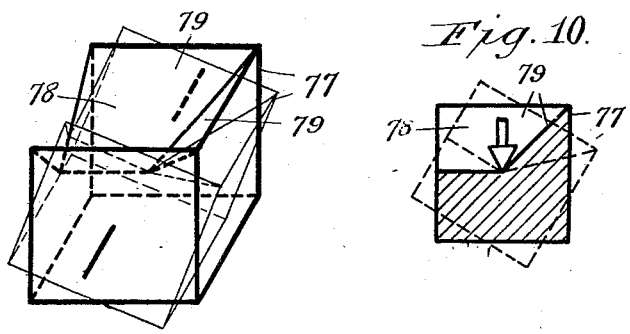
Figs. 9 and 10 are diagrammatic views of the adjustable element furnishing the guiding surface or surfaces for the lateral, opening, and incisive movements of the upper jaw member.
Figure 10:
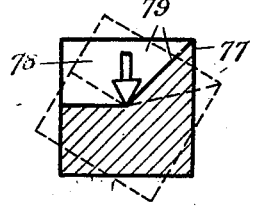

In Fig. 8 I have diagrammatically illustrated the principle employed in this articulator, which is designed to perform all masticatory movements. From this figure it will be clear that the inner ends of the supporting levers 55 are fulcrumed at selected points of the frame and swung on spherical or spheroidal projections or supports, and that therefore the outer ends of said levers move along surfaces of spheres. By reason of said outer ends being connected by the spindle or transverse pivot member 49, which latter is supported thereby and by the ball and socket device forming part of the rod or transverse member 36, I have hereinbefore referred to said spindle or pivot member as a floating spindle or pivot member, since it is free to move forwardly or rearwardly in an arc of a circle and have component lateral movements. Said spindle or pivot member may therefore be said to be harnessed, as it may be moved in various directions within limited space, and with the rod or transverse member 36 adjustable in an arc of a circle, the following action may take place. For example, the ball or spherical terminals 53 of the spindle or pivot member 49 move in intersections of segments of spherical surfaces whose centers are the spherical inner ends 57 of the pivot studs 58 and the center of the ball and socket device on the rod or transverse member 36. Said floating or harnessed spindle or pivot member is therefore capable of imitating movements of the condyle heads in the condyle path; thus the movements of the spherical ends of the floating or harnessed pivot member which represent the two points of the triangle at opposite ends of the base are accounted for, while the third point or apex of the triangle which represents the contact point of the lower central incisor is moved in accordance with the guide pin 71 and the adjustment of the guide block or pin, as it may be termed, as said pin is vertically adjustable in the upper jaw member which represents the maxilla, and this member is hinged to the floating or harnessed pivot member 49 to allow said upper jaw member to oscillate with said pivot member, the opening and closing movement is reproduced with or without the various component movements capable of being executed by the human jaw. It might here be stated that the guide block or pin guide 77 may be referred to as the incisive guide, since it and its co-acting pin serve to guide and in particular, control the incisive movement. This incisive guide is diametrically illustrated in Figs. 8 and 9 wherein the adjustability of the same is clearly shown.

Having thus described my invention, what I claim is:—

1. A dental articulator comprising a pair of superposed members adapted to carry a set of artificial teeth, adjustable means on one of said members for adjusting the direction and relative magnitude and the lateral movement and direction of the incisive movement thereof upon two constrained spherical paths, and an open guiding surface for said members.

2. A dental articulator comprising a pair of superposed members adapted to carry a set of artificial teeth, supporting means on one of said members, means for adjusting said supporting means along two spherical path surfaces for adjusting the lateral, the incisive, and the opening movements thereof in direction or magnitude, or in both direction and magnitude, and an open guiding surface for said member.

3. A dental articulator comprising a pair of superposed members adapted to carry a set of artificial teeth, and means for adjusting the lateral movement of one of said members in three dimensions upon two spherical path surfaces, and an open guiding surface for said member.

4. A dental articulator comprising a pair of superposed members adapted to carry a set of artificial teeth, one of said members being mounted to swing on a center, means for causing said center to move along intersections of spherical surfaces to govern the movement of each individual condyle point, and means for adjusting the centers of said first-mentioned means in space.

5. A dental articulator comprising a frame having a pair of spherical elements extending therefrom, two opposing jaw members carried by said frame, one of said members being immovable, a universally movable elongated pivot element on which the other of said members is mounted, two spaced points of said pivot element being constrained to move along intersections of spherical path surfaces, the centers of which are adjustable on said frame.

6. A dental articulator comprising a frame, two opposing jaw members relatively movable, means for supporting one of said members on an elongated pivot element, levers universally mounted on said frame and having their universal connections to said frame movable along an arc of a circle, said levers having universal connection with the ends of said elongated pivot element.

7. A dental articulator, comprising a frame, a pair of levers having coinciding axes on said frame, a second pair of levers swinging on spherical surfaces provided on said frame, means for adjusting the inner ends of one of said two pairs of levers relatively, a jaw member fixed to said frame, a second jaw member supported by the outer ends of said second pair of levers, and a guiding member for said last-mentioned jaw member.

8. A dental articulator comprising a frame, a pair of levers pivotally connected to said frame, a second pair of levers swinging on spherical surfaces provided on said frame, means for adjusting the outer ends of the first-mentioned pair of levers and the inner ends of the second-mentioned pair of levers, a jaw member fixed to said frame, a second jaw member supported by the outer ends of said second pair of levers, and a guiding member for said last-mentioned jaw member.

9. A dental articulator comprising a frame, a jaw member immovable on said frame, a second jaw member spaced from said first jaw member, a pivot element on which said second jaw member is mounted, diverging elongated elements pivotally connected to said pivot element, and adjustable centers for said diverging elongated elements on which they swing.

10. A dental articulator, comprising a pivot member, a pair of co-operating jaw members, one of which is applied to said pivot member, co-acting guide members on said jaw members, and means for so supporting said pivot member that spaced points thereof move along two constrained path surfaces changeable in space when moving the jaw member applied to said pivot member.

11. A dental articulator, comprising a frame having two jaw members arranged for relative movement, one of said members having a guiding projection, and a rotatable guide block having its axis of rotation at an angle to said projection and having three guide surfaces at an angle to each other and adapted for co-action with said guiding projection.

12. A dental articulator, comprising two jaw members, guiding means at corresponding points of said jaw members including an inclined surface on one of said members and a projection on the other co-acting with said inclined surface, one of said members being adapted to swing on an axis movable along a segment of a circle and having a component movement therewith over a segment of a sphere intersecting said segment of a circle.

13. A dental articulator, comprising two jaw members, guiding means at corresponding ends of said jaw members including an inclined surface on one of said members and a projection on the other co-acting with said inclined surface, a spindle on which one of said members is pivoted, members extending from said spindle and being movable on universal joints at distant points from said spindle so as to allow the ends of said spindle to travel along segments of spheres.

14. A dental articulator, comprising two jaw members, guiding means at corresponding ends of said jaw members including an inclined surface on one of said members and a projection on the other co-acting with said inclined surface, a spindle on which one of said members is pivoted, a pair of levers having one of their ends connected to said spindle by ball and socket joints and having their other ends swinging on ball and socket joints, and a rearwardly projecting element extending from said spindle and connected to a spheroidal element within a supported socket fitting said spheroidal element.

15. A dental articulator comprising two jaw members, guiding means at corresponding points of said jaw members including an inclined surface on one of said members and a projection co-acting with said inclined surface, one of said members being adapted to swing on a pivot element, two spaced points of which are movable along segments of two spheres and having a component movement therewith over a segment of a third sphere intersecting the first-mentioned segments of spheres.

16. A dental articulator, comprising a lower jaw member, an inclined guiding surface carried by said lower jaw member, an upper jaw member having a longitudinal bore therein, a rod detachably secured within said bore, a depending sleeve secured to said rod at the front end of said upper jaw member, a lock nut threaded into the lower end of said sleeve and providing an upwardly facing shoulder within said sleeve, and a guide pin threaded into said sleeve and having a reduced lower end forming a downwardly facing shoulder engaging the upwardly facing shoulder formed by said lock nut, said reduced lower end passing through said lock nut and projecting through the lower end thereof with its lower extremity engaging said inclined guide surface.

17. A dental articulator, comprising a frame, an immovable jar member on said frame, a pivot member, a jaw member applied to said pivot member, means for adjusting the axis of said pivot member along an arc of a circle whose center is adjustable along an arc of a reverse circle, an adjusting element movable along an arc of a circle, and means for connecting said pivot member with said adjusting element.

18. A dental articulator, comprising a frame having spaced side members, segmental slots in said side members, a lever pivoted to each side member and co-acting with the segmental slot therein, a transverse member rotatable in the outer ends of said levers and having a socket between its ends, a spherical element confined within said socket, spherical projections extending from said side members, a pair of levers having socketed ends to receive said spherical projections and extending upwardly and forwardly from the latter, a connecting member having ball and socket connections with the upper ends of said last-mentioned levers and having an opening between its ends, a rod pivoted within said opening and extending rearwardly for connection with said spheroidal element, an upper jaw member carried by said connecting member, a lower jaw member rigid on said frame, and co-acting means on said jaw members to furnish the incisive movement to comply with the varying overjets and overbites.

19. A dental articulator, comprising a frame having spaced side members provided with two pairs of conversely arranged segmental slots, a pair of levers pivotally connected to said side members and having bosses at their outer ends projecting through one pair of said slots, a transverse member rotatable and longitudinally movable in said bosses and including a ball and socket device at a point between said side members, means for retaining said levers in any adjusted position, elements individually adjustable within the other pair of segmental slots and including a spheroidal projection, a pair of levers having sockets receiving said spheroidal projections and extending upwardly therefrom, a connecting member extending transversely and having opposite ends connected to said second pair of levers by ball and socket joints, said connecting member having an opening therethrough at a point midlength thereof, a screw rod having one end pivotally connected within said opening and extending rearwardly and upwardly therefrom, said screw rod extending through the ball and socket device of said transverse member and being adjustable therein, a lower jaw member immovable on said frame, an upper jaw member pivoted on said connecting member, and co-acting means on the front ends of said jaw members for determining the incisive movement.

20. A dental articulator, comprising a frame having spaced side members, a ball and socket device centrally between said side members and adjustable in an arc of a circle, a pair of supporting elements adjustable in an arc of a circle, a pair of levers being universally connected with said supporting elements, a transversely-disposed spindle having universal connections with said pair of levers, a screw rod connected to said spindle and being passed through the ball portion of said ball and socket device, an upper jaw member pivoted to said spindle, a lower jaw member on said frame, and co-acting guide elements on said jaw members to regulate the incisive movement of one of said members.

21. A dental articulator having a lower jaw member and an upper pivoted jaw member movable toward and from said lower jaw member, the pivot of said upper jaw member being universally supported on adjustable centers, a supported adjustable ball and socket device, and adjustable connection between said pivot and said ball and socket device.

22. A dental articulator, comprising a frame having two side members provided with segmental slots, a pair of levers pivotally connected to said side members and extending upwardly and forwardly therefrom, said levers having outwardly projecting bosses at their upper ends extending through the segmental slots in said side members, said bosses being adjustable within said slots when swinging said levers, a rotatable and longitudinally movable transverse member extending through said bosses, means on said bosses for clamping said transverse member in any adjusted position, a universally supported spindle transversely disposed in a plane in advance of said transverse member, a screw rod having pivotal connection with said spindle, and universal connection with said transverse member and being adjustable through said transverse member to move said spindle toward or from said transverse member, an upper jaw member pivoted on said spindle and a lower jaw member immovably applied to said frame and with which said upper jaw member co-operates.

23. A dental articulator, comprising a frame having two side members provided with two pairs of segmental slots oppositely arranged, a pair of levers pivotally connected to said side members and having projecting portions extending through one pair of said slots, a second pair of levers pivotally connected to said frame and having outward extensions adjustable in the other pair of slots, a third pair of levers having universal connections with said last-mentioned pair of extensions, a transverse pivot member having universal connections with said third pair of levers, a transverse member movable in an arc of a circle and guided for movement in said side members, a screw rod having adjustable connection with said transverse member and pivotal connection with said spindle member, an upper jaw member pivotally connected to said spindle, and a lower jaw member on said frame with which said upper jaw member co-operates.

24. A dental articulator, comprising a frame having spaced side members, two pairs of levers pivotally connected to said side members and being oppositely disposed, the outer ends of said levers being adjustable and retainable along said side members, a ball and socket device carried by the outer ends of one pair of said levers, a third pair of levers having universal connections with the outer ends of the other pair of said levers, a transverse spindle having universal connections with said third pair of levers, a screw rod pivotally secured with one end to said transverse spindle and threaded through said ball and socket device, means for adjusting said screw rod to move said spindle toward and from said ball and socket device, an upper jaw member pivoted to said spindle, and a lower jaw member on said frame with which said upper jaw member co-operates.

25. A dental articulator, comprising a lower fixed jaw member, an upper jaw member co-operating with said lower jaw member, a pivot member substantially horizontally-disposed on which said upper jaw member is pivoted for vertical swinging movement, means at the ends of said pivot member for allowing component lateral movements of said upper jaw member with its vertical movement, said means including a pair of levers connected to said spindle by universal joints and having universally jointed connections with individually adjustable centers, a screw rod pivotally secured to said spindle, and a ball and socket device adjustable on said frame through which said screw rod extends.

26. A dental articulator, comprising a frame having a lower jaw member, a transversely-disposed pivot member supported on three individually adjustable universal joints spaced apart, one of said universal joints being above and in rear of said pivot member, and the others in a plane or planes beneath said pivot member, and an upper jaw member mounted for vertical swinging movement on said pivot member.

27. A dental articulator, comprising a frame having spaced side members provided with segmental slots and having graduations along said slots, a pair of levers having fixed centers on said frame and projecting portions at their outer ends projecting through said slots, means for retaining the outer ends of said levers at any point or points along said slots readily determinable by said graduations, a second pair of levers connected to the outer ends of said first-mentioned pair of levers by universal joints, a third pair of levers pivoted to said side members and extending in an upward direction from their pivotal points, a transverse member connected to the outer ends of said third pair of levers, a transversely-disposed pivot member connected at opposite ends by ball and socket joints with said second pair of levers, an adjustable screw rod pivotally connected to said pivot member and extending upwardly and rearwardly therefrom and being universally connected with said transverse member, a jaw member immovable on said frame, and a second jaw member pivotally mounted on said transverse spindle member and co-operating with said immovable jaw member.

28. In a dental articulator, the combination with a frame, of a pair of jaw members, a pivot member on which one of said jaw members is arranged to swing, a pair of levers connected with opposite ends of said pivot member by universal joints, a second pair of levers pivotally connected to fixed points and having ball and socket connections at their outer ends with the inner ends of said first-mentioned pair of levers, said second pair of levers having stop lugs to limit the forward and downward movement of the outer ends of said first-mentioned pair of levers, and an adjustable ball and socket device having adjusting connection with said transverse pivot member.

29. A dental articulator, comprising a frame, an immovable jaw member on said frame, elongated pivot member, a jaw member applied to said pivot member, means for supporting the ends of said pivot member to permit equal or unequal movements thereof over spherical surfaces, an adjusting element movable along an arc of a circle, and means for adjustably connecting said adjusting element with said pivot member.

30. In a dental articulator, an incisal guide having a pair of spaced lugs, one of said lugs having a slot opening to the edge thereof, a guide block provided with a depression in its upper side having inclined walls and a pin seated in the slot of said last-mentioned lug, and a set screw passing through the other lug and entering said guide block.

31. A dental articulator having a pair of upstanding lugs with one of said lugs provided with a slot opening to the edge thereof, a guide block positioned between said lugs and having a pin projecting from one end thereof and entering said slot, a head at the outer end of said pin, and a set screw extending through the other lug and entering said guide block, the whole being arranged to permit the guide block to be rotated by said head upon loosening said set screw and to be retained in any rotatably adjusted position upon tightening said set screw.

32. A dental articulator, comprising a substantially horizontally-disposed pivot member, an upper jaw member pivotally applied to said pivot member, a lower jaw member beneath said upper jaw member, coacting guide elements on said jaw members, and means for causing said pivot member to move along intersections of spherical surfaces.

33. A dental articulator, comprising a substantially horizontally-disposed pivot member, an upper jaw member pivotally applied to said pivot member, a lower jaw member beneath said upper jaw member, co-acting guide elements on said jaw members, one of said guide elements having an open guide surface, and means for causing two spaced points of said pivot member to move along two constrained spherical path surfaces when moving said upper jaw member, the upper jaw member being guided at one point by said open guide surface.

34. A dental articulator comprising a frame, a pair of levers adjustable in an arc of a circle, a ball and socket device carried by said levers and adjustable therewith, a second pair of levers adjustable on an arc of a circle, a third pair of levers having universal connections with said second pair of levers and having said connections adjustable with said second pair of levers, a transverse pivot member having universal connections at opposite ends with said third pair of levers, a screw rod pivotally connected to said transverse pivot member and being threaded through said ball and socket device, an upper jaw member pivoted on said transverse pivot member, a lower jaw member spaced from said upper jaw member, and co-acting guiding elements on said jaw members.

35. The combination with a frame, a ball and socket device adjustable laterally on said frame and forwardly and backwardly in an arc of a circle, a transverse pivot member, a pair of levers having adjustable ball and socket centers at one end and having ball and socket connections with the outer ends of said transverse pivot member, and a connecting element having pivoted connections with said transverse pivot member and threaded connection with said ball and socket device, a jaw member pivoted on said transverse pivot member and having a depending guide element, and a jaw member spaced from said first-mentioned jaw member and having an adjustable upwardly-facing inclined guide surface adapted for co-action with said guide elements.

36. A dental articulator, comprising a frame, a ball and socket device adjustable in an arc of a circle, a screw rod threaded through said ball and socket device, a transversely-disposed pivot member having pivotal connection with said screw rod, a pair of levers having ball and socket connections with the ends of said transverse pivot member and having pivot centers adjustable in an arc of a circle, an upper jaw member pivotally connected to said transverse pivot member and having a depending guide pin, a lower jaw member having a fixed position, and a guiding element having an inclined surface or surfaces with which said depending guide pin co-acts.

37. A dental articulator, comprising a frame, an immovable jaw member on said frame, an elongated pivot member, adjustable means supporting opposite ends of said pivot member for uniform or non-uniform movements, a second jaw member applied to said pivot member, and an adjusting member movable along an arc of a circle including a screw rod pivotally connected to said pivot member between its ends.

38. A dental articulator, comprising a frame, a pair of levers having spherical elements at their outer ends and having said outer ends independently adjustable along arcs of circles, a second pair of levers universally connected at their inner ends to the outer ends of said first-mentioned pair of levers, a pivot member universally connected at opposite ends to the outer ends of said second pair of levers, a third pair of levers having an adjusting element connected to and arranged between the outer ends thereof and adjustable along an arc of a circle, adjustable connecting means between said adjusting element and said pivot member pivotally connected to said pivot member, an immovable jaw member on said frame, and a second jaw member applied to said pivot member.

In testimony whereof I affix my signature.

RUDOLPH L. HANAU.